United States Patent [19]
Everton et al.
[11] 3,736,386
[45] May 29, 1973

[54] MEANS FOR SAMPLING TRANSMISSIONS IN TELECOMMUNICATION SYSTEMS

[75] Inventors: Deloss W. Everton, San Jose; David D. Meacham, Redwood City, both of Calif.

[73] Assignee: Pearson Electronics, Inc., Palo Alto, Calif.

[22] Filed: Sept. 24, 1970

[21] Appl. No.: 75,153

[52] U.S. Cl. ....................179/175.3
[51] Int. Cl. ....................H04b 3/46
[58] Field of Search ....................179/175.3; 324/76, 324/132; 321/47, 20; 330/97, 25

[56] References Cited

UNITED STATES PATENTS

| | | | |
|---|---|---|---|
| 3,559,088 | 1/1971 | Booth et al. | 330/25 |
| 3,546,616 | 12/1970 | Hargasser et al. | 330/25 |
| 3,264,569 | 8/1966 | Lefferts | 330/97 |
| 2,324,215 | 7/1943 | Kinsburg | 179/175.3 |
| 2,313,666 | 3/1943 | Peterson | 324/132 |
| 3,237,028 | 2/1966 | Gibbons | 324/132 |
| 3,227,947 | 1/1966 | Muller | 324/132 |
| 2,264,132 | 11/1941 | Felch | 179/175.3 |
| 2,861,182 | 11/1958 | Green | 324/132 |

*Primary Examiner*—Kathleen H. Claffy
*Assistant Examiner*—Douglas W. Olms
*Attorney*—Mellin, Moore & Weissenberger

[57] ABSTRACT

A method of sampling transmissions in telecommunication systems including the steps of rectification and logarithmic amplification of the voltage present at a point in the system and application of such rectified and logarithmically amplified voltage to a linear voltage indicating device is disclosed. Apparatus for practicing the method and particular circuitry for use in such apparatus is described, which circuitry includes a half wave voltage rectifier circuit including a direct current feedback loop.

6 Claims, 5 Drawing Figures

INVENTORS
DELOSS W. EVERTON
DAVID D. MEACHAM
BY
Mellin, Moore & Weissenberger
ATTORNEYS INVENTORS
DELOSS W. EVERTON
DAVID D. MEACHAM
BY
Mellin, Moore + Weissenberger
ATTORNEYS INVENTORS
DELOSS W. EVERTON
DAVID D. MEACHAM
BY
Mellin, Moore + Weissenberger
ATTORNEYS

MEANS FOR SAMPLING TRANSMISSIONS IN TELECOMMUNICATION SYSTEMS

BACKGROUND OF THE INVENTION

This invention relates to methods of and means for sampling transmissions in telecommunication systems and more particularly to methods of and means for field testing transmissions in telephone lines using apparatus which is portable, self-powered and which includes self-compensating circuitry.

The "transmission level" at a point in a telecommunication system is defined as the ratio of the power measured at that point to a power level chosen as a standard for comparison (i.e., transmission level = $P_1/P_2$ where $P_2$ is the standard power level). For example, in telephone systems the power level chosen as the standard is usually 1 milliwatt. Since a given telecommunication system is always designed with all line terminations of a given impedence, it is possible to determine the transmission level at any given point in the system by measuring the voltage across or current through a line termination of such given impedance. (i. e., since $P = E^2/R = I^2R$, and $R$ is constant, then $P_1/P_2 = (E_1)^2/(E_2)^2 = (I_1)^2/(I_2)^2$ Thus, in telephone systems the standard power level is usually defined as either 1 milliwatt in 600 ohms or 1 milliwatt in 900 ohms and the transmission level at a given point in the system may be measured by applying 1 milliwatt of power (Usually at 1,000 cycles per second) to the system; connecting an impedance of either 600 ohms or 900 ohms (as appropriate to match the impedance of the telephone system under test) across the line at a given point; and comparing voltage across or current through such impedance to the voltage or current which would result if the standard power level were present at such given point.

The "noise level" (i.e., amount of noise transmission) at a point in a telecommunication system is defined as the ratio of the total power of random frequencies present at such point in the system due to spurious effects to the power level chosen as the standard for comparison. Such total power due to "noise" transmission may be deduced from the voltage across or current through the appropriate terminating impedance at the selected point in the system as discussed in connection with transmission level measurements.

It is desirable to express both the transmission level and the noise level logarithmically in terms of decibel or db units (i. e., db = 10 log $P_1/P_2$ = 20 log $E_1/E_2$ = 20 log $I_1/I_2$.

The standard power level is considered the "zero db power level" with transmission levels expressed in db units from the "zero db power level" and noise levels expressed in db units from a selected level below the "zero db power level".

Thus, prior art devices have utilized logarithmic scales on a meter connected in the circuit to indicate the voltage across or current through a terminating impedance of the system at the desired point. U.S. Pat. Nos. 1,869,515; 1,920,456; 1,954,396; 2,476,992 and 2,666,099 are representative of prior art apparatus for measuring transmission levels in telephone systems, for example.

Unfortunately, the graduations on a logarithmic scale are non-uniform by definition, thus making it impossible to obtain the same accuracy of readings at the low end of the scale as at the high end of the scale. Thus, in the prior art, the range of such scale is arbitrarily limited and attenuators are used to enable the lower levels to be read at the higher end of the scale.

It is an object of this invention to provide a method for indicating levels of transmissions in a telecommunication system in decibels on a linear scale.

It is another object of this invention to provide an apparatus calibrated in decibels on a scale with linear graduations.

It is a further object of this invention to enable the level of transmissions in a telecommunication system to be measured with constant accuracy over a range of about 40 decibels without the use of attenuators.

It is yet another object of this invention to provide apparatus for sampling levels of transmissions in a telecommunication system which includes self-compensating circuitry and which is self-powered and portable.

SUMMARY OF THE INVENTION

Briefly, the method of this invention includes the steps of rectifying the voltage present across a given impedance at a given point in a telecommunication system, logarithmically amplifying such rectified voltage and applying said logarithmically amplified voltage to a linear indicating device. Apparatus according to this invention comprises a given terminating impedance, a voltage rectifier including a direct current feedback loop, a logarithmic voltage amplifier, a linear indicating device, means for coupling the given terminating impedance to the line under test, means coupling the rectifier to the given characteristic impedance, means coupling the output of the rectifier to the input of the logarithmic voltage amplifier and means coupling the output of the logarithmic voltage amplifier to the linear indicating device.

BRIEF DESCRIPTION OF THE DRAWING

The foregoing and other objects and features of this invention will be more apparent from the following detailed description when read in conjunction with the appended drawings wherein.

DESCRIPTION OF PREFERRED EMBODIMENT

Figures 1, 5:
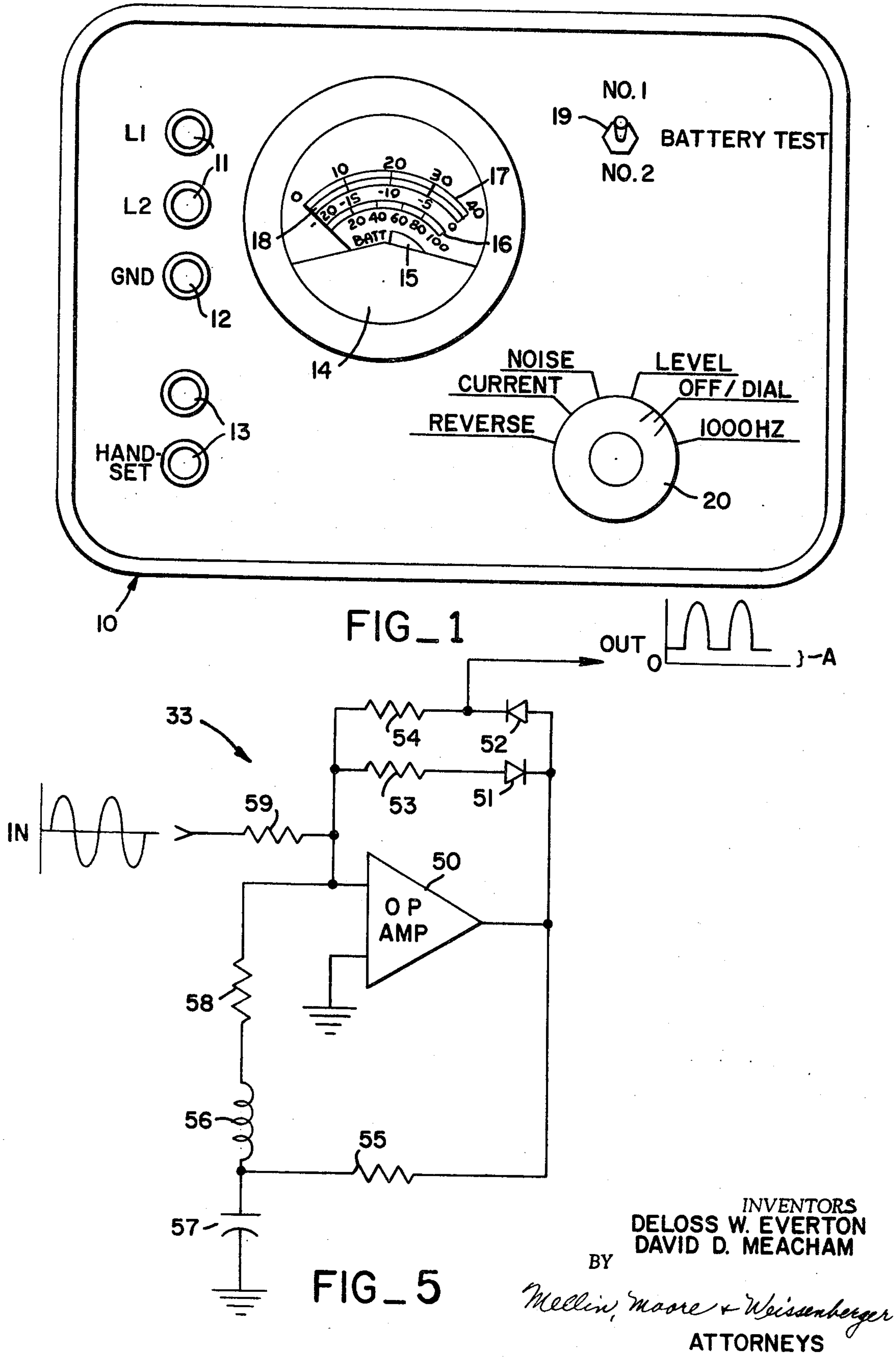
FIG. 1 is a plan view of a telephone line test set in accordance with one embodiment of this invention.
FIG. 5 is a schematic diagram of the voltage rectifier circuit according to the teaching of this invention.

Referring to the drawings, an embodiment of this invention specifically adapted for sampling transmissions in a telephone communication system is shown. It will be understood that this invention may be adapted for sampling transmissions in other types of telecommunications systems. However, for ease of understanding, the invention will be described in detail in connection with the drawing as applied to the sampling of transmissions in a telephone system.

Referring to FIG. 1, a plan view of a portable battery-powered transmission sampling unit 10 for use in the field by a telephone repairman is shown. The dimensions and weight of the unit 10 are such that it may be easily carried by the telephone repairman even when climbing a telephone pole to obtain access to an appropriate point in the telephone system.

As shown in FIG. 1, the unit 10 provides a pair of binding posts 11 to which a pair of lines of the telephone system are connected in operation. A further binding post 12 provides means for grounding the unit through an appropriate connection. Binding posts 13 provide means for connecting a conventional field test-type hand set to the unit, by which appropriate stations in the telephone system may be dialed. The binding posts 11—13 may be of any type, but preferably provided for easy and quick connection and disconnection of elements thereto in order to enhance the convenience of the unit.

A meter 14 provides the linear indicating device according to this embodiment of the invention. As shown in FIG. 1, the face of the meter 14 is provided with separate scales for use in performing the various functions of which the unit is capable as will be described more fully hereinafter. The face of the meter 14 is also provided with a battery test scale 15 for use in determining the condition of the batteries contained in the unit and by which the unit is powered. The other scales on the face of the meter 14 are divided into linear graduation and include a scale 16 for measuring from zero to 100 miliamperes of current, a scale 17 for measuring from zero to 40 decibels (db) of noise transmissions, and a scale 18 for measuring the transmission level in negative decibel (db) units with full scale deflection of the needle of the meter 14 indicating the reference transmission level or "zero db power level."

Since two batteries are used to power the unit 10, a battery test switch 19 is provided by which each of the batteries may be independently connected across the meter 14 to provide an indication of the operating condition thereof. Satisfactory operating condition of the batteries will be indicated by deflection of the needle of the meter 14 into the appropriate range of the battery test scale 15. The battery test switch may conveniently be of the spring-loaded toggle type adapted to normally connect the meter 14 to appropriate wafers of a multi-wafer rotary function switch 20 and providing a double-throw action by which the meter 14 may be momentarily disconnected from the function switch 20 and connected across each of the batteries independently.

The multi-wafer rotary function switch 20 is used to select one of the various functions which the unit is capable of performing. As shown in FIG. 1, the function switch 20 is in its "off/dial" position. With the function switch 20 in this position, each of the binding posts 11 are directly connected to a different one of the binding posts 13 and the unit 10 is otherwise disconnected from the binding posts 11. Thus in this position the function switch 20 enables a hand set connected to binding posts 13 to be used to dial various stations in the telephone system as well as voice communication with such stations. In all other positions of the function switch 20, the binding posts 13 are disconnected from the unit.

Such other positions of the function switch 20 include a position in which a signal generator contained within the unit 10 and capable of generating a 1,000 hertz signal at the zero db power level is coupled to the binding posts 11 so that the output thereof may be transmitted along telephone lines connected to such binding posts 11. In further positions of the function switch 20, the binding posts 11 are inductively coupled to an impedance having the appropriate value for the system and the voltage developed across such impedance by transmissions along the telephone lines connected to binding posts 11 is amplified, rectified and applied to the meter 14 in accordance with the teaching of this invention to provide an indication of the transmission level or noise level on such telephone lines, which levels may be read on the appropriate scale of the meter 14. Finally, in still other positions of the function switch 20 the binding posts 11 are connected across the meter 14 through an appropriate resistance which, together with the resistance of the meter 14, simulates the impedance of a conventional carbon transmitter for use in the telephone system under test to provide an indication of the current that would flow in such transmitter.

Figure 2:
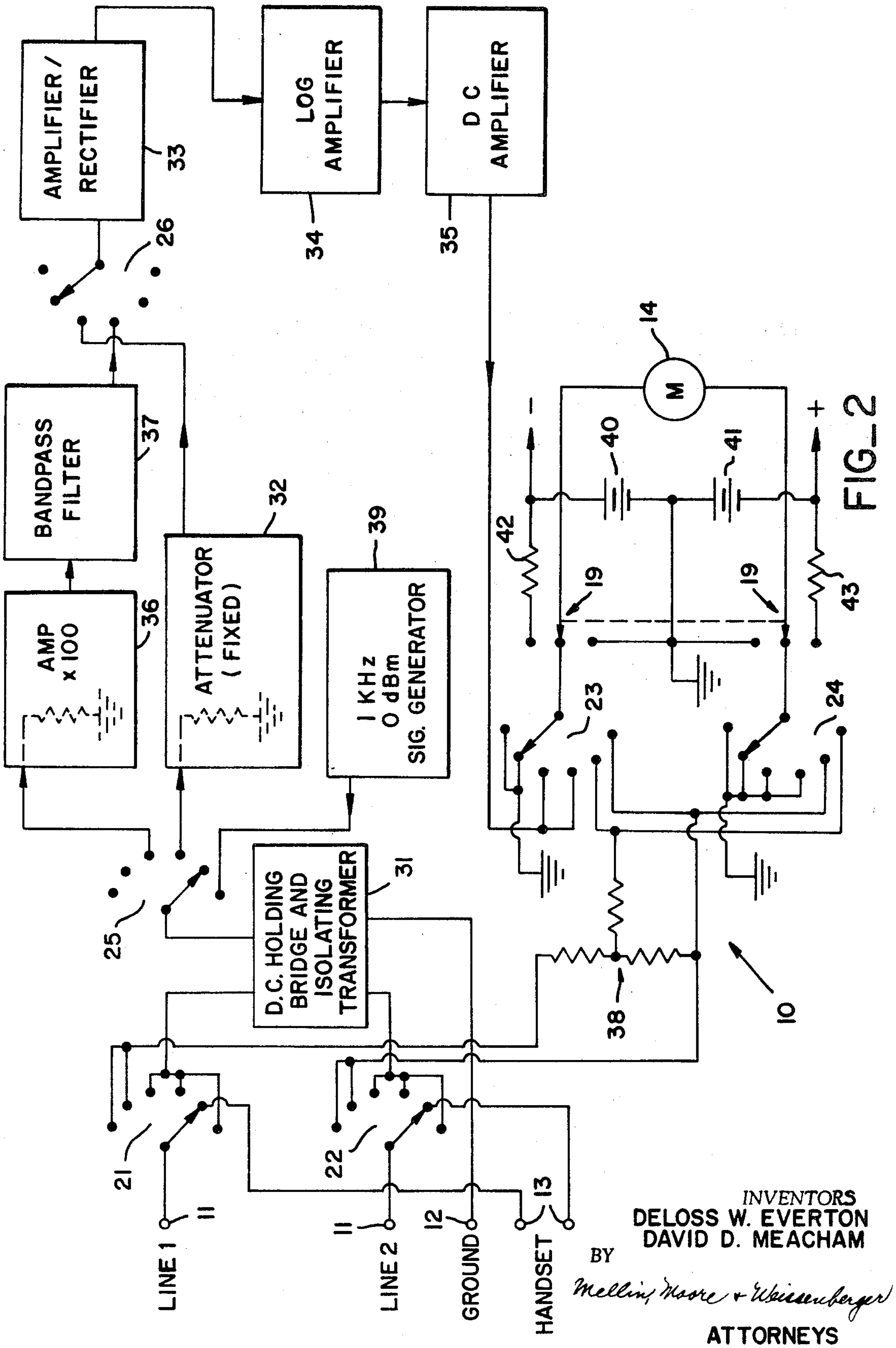
FIG. 2 is a schematic diagram partially in block diagram form of the telephone test set shown in FIG. 1.

The operation of the unit 10 in accordance with this embodiment of the invention will be more fully understood by reference to FIG. 2 wherein the various elements of the unit are shown partially schematically and partially in block diagram form. For ease of understanding, the reference numerals of FIG. 1 have been used as appropriate to indicate corresponding elements in FIG. 2. Various wafers of the function switch 20 are identified in FIG. 2 by reference numerals 21–26 respectively and the rotary contact thereof is shown in the "off/dial" position as indicated in FIG. 1. It will be understood that the rotary contact of all of the wafers 21–26 rotate simultaneously and in the same direction. Thus, in the "off/dial" position as shown in FIG. 2, one of the binding posts or terminals 11 (identified in the drawing as "line 1") is connected to one of the binding posts or terminals 13 through wafer 21 of the function switch and the other of the binding posts or terminals 11 (identified in the drawing as "line 2") is connected to the other of the binding posts or terminals 13 through wafer 22 of the function switch 20. With the function switch 20 in this position, the remainder of the unit is nonoperative or "off" and to this end both sides of the meter 14 are connected to ground through wafers 23 and 24 of the function switch with the rotary contact of wafers 25 and 26 being located on a blank or unused contact. With the rotary contacts of the various wafers 21–26 of the function switch 20 in this position, a hand set connected to binding posts or terminals 13 will be connected across a pair of lines of the telephone system connected to binding posts or terminals 11 and may be used to dial any appropriate station as desired. For example, the hand set may be used to dial the appropriate number to reach a 1,000 hertz signal generator located at the central station and designed to apply the zero db power level to the line for transmission to the sampling unit 10. When the 1,000 hertz tone is heard in the hand set, the telephone repairman would rotate the function switch 20 one step in the counterclockwise direction to the position marked "level" in FIG. 1. As shown in FIG. 2, the rotary contacts of wafers 21, 22, 23, 24, 25 and 26 would be thereby rotated one step in the counterclockwise direction. Thus an inductive DC holding bridge and isolating transformer 31 will be connected across the terminals 11 through wafers 21 and 22 respectively and a fixed attenuator 32 will be connected to the output of such holding bridge and isolating transformer 31 through the wafer 25. The voltage developed across such attenuator 32 will be connected through wafer 26 to the input of an amplifier/rectifier 33, the output of which is connected through a log amplifier 34, linear DC amplifier 35 and the wafer 23 to one side of the meter 14. The other side of the meter 14 will be connected to ground through the wafer 24.

It will be understood that the DC holding bridge and isolating transformer 31 presents a high AC impedance to the telephone lines while at the same time providing a DC current path to perform a circuit holding function. It will also be understood that the input impedance of the attenuator 32 is matched to the impedance of the system under test through the isolating transformer. The gain of the amplifiers 33, 34 and 35, as well as the internal resistance of the meter 14 are selected so that a full-scale deflection of the meter 14 will result if the power level present at the input terminals 11 is equal to the reference or zero db power level. However, some attenuation will occur between the central station and the point along the telephone lines at which the unit 10 is connected into the telephone system. Thus the power level at the terminal 11 will be less than the reference or zero db power level and less than full scale deflection of the needle of meter 14 will result. According to this embodiment of the invention, the ratio between the power level actually present at the terminals 11 and the reference or zero db power level is indicated in negative decibel units on the linear scale 18 (see FIG. 1) of the meter 14.

Figure 3:
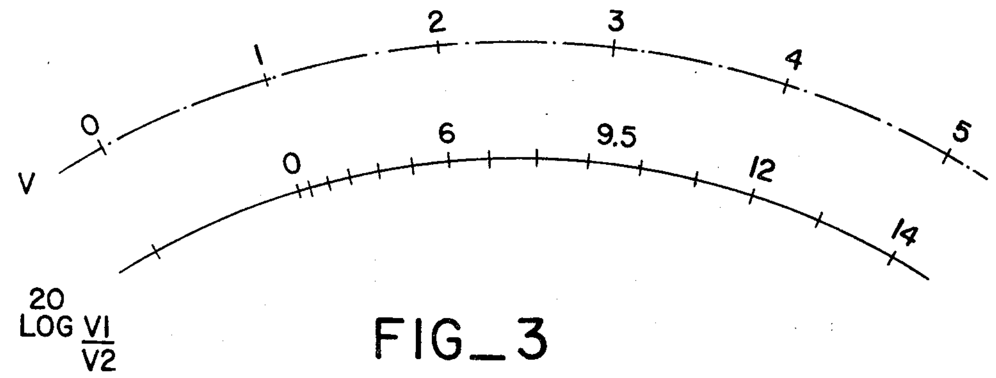
FIG. 3 is a logarithmic decibel scale according to the prior art with a corresponding voltage scale shown in phantom.

It will be understood that according to he teaching of the prior art, the voltage developed across the attenuator 32 or the current induced in the attenuator 32 would be linearly amplified, if required, and applied to the meter 14 in which case a 1-volt change in the voltage developed across the attenuator or a 1-ampere change in the current through it would result in a given change in the deflection of the needle of the meter, the amount of such deflection being constant throughout the range thereof. Thus, according to the teaching of the prior art, it was necessary to use a scale divided into logarithmic units on the face of the meter 14 as shown in FIG. 3 in order to enable direct reading of such meter in decibel units. Since $\text{db} = 10 \log P_1/P_2 = 20 \log E_1/E_2 = 20 \log I_1/I_2$, a 1-volt (or 1-ampere) change would represent a much smaller decibel change at the higher end of the scale. Thus it is obviously impossible to read such a scale as accurately at the low end of the scale as at its high end. In an attempt to overcome this difficulty, the range of the scale was reduced and a series of attenuators was used to enable the lower levels to be read at the high end of the scale.

Figure 4:
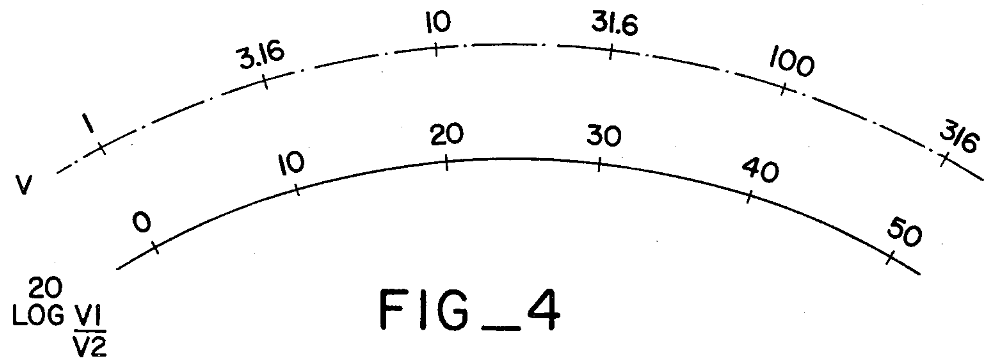
FIG. 4 is a linear decibel scale according to the teaching of the present invention with a corresponding voltage scale shown in phantom.

According to the teaching of this invention, the voltage developed across the attenuator 32 is rectified, applied to the input of a logarithmic voltage amplifier and the output of such logarithmic voltage amplifier is applied to the meter 14. Logarithmic voltage amplifiers are well known in the art and thus are not described in detail herein. Briefly, a logarithmic voltage amplifier includes a feedback loop appropriately connected to cause the voltage gain thereof to decrease logarithmically as the input voltage increases. Thus a much larger (i.e., a logarithmic) increase in the input voltage to the logarithmic amplifier is required to produce a 1 -volt change in the output thereof at higher input voltage levels than is required at lower input voltage levels. When the output of the logarithmic amplifier is applied to a linear indicating device such as the meter 14, a scale having linear graduations as shown in FIG. 4 may be used to indicate the logarithmic variations in the input voltage to the logarithmic amplifier. This not only enables the logarithmic variations to be read with equal accuracy at every point in the scale, but also enables the use of a much larger range on the scale, since there is no variation in accuracy at opposite ends of such range. Thus, according to the teaching of this invention, a range of 20 decibels is easily obtained through proper selection of resistance values and amplifier gain. In fact, a range of 40 decibels is provided for the measurement of noise transmissions as will be described hereinafter.

The measurement of noise transmissions is accomplished by dialing the appropriate station and then rotating the function switch a further step in the counterclockwise direction to the position marked "noise" in FIG. 1. As before, the terminal 11 are connected across the DC holding bridge and isolating transformer bridge 31 through wafers 21 and 22. However, the output of the isolating transformer is connected through wafer 25 to a different attenuator associated with a linear high-gain amplifier 36. Such amplifier 36 is required since it is desired to measure noise levels ranging upwardly from a power level substantially lower than the zero db level (eg. 90 db down) rather than downwardly from the zero db level, as in the case of measuring transmission levels. The output of the linear high-gain amplifier 36 is applied to an appropriate band pass filter 37 which in the case of a telephone system would pass only frequencies within the audio band, since frequencies outside the audio band would contribute to the reading of noise level but would not actually be harmful in the utilization of the telephone system. The output of the band pass filter is connected through the wafer 26 to the amplifier/rectifier 33, the output of which is connected through the logarithmic voltage amplifier 34, linear DC amplifier 35 and wafer 23 to one side of the meter 14, the other side of the meter 14 being connected to ground through the wafer 24. As indicated by the scale 17 in FIG. 1, the resistances involved and the gains of the amplifiers are selected so that a full-scale deflection of the needle of the meter 14 represents a noise level at the terminals 11 which is 40 decibels above a selected power level below the zero db power level. As shown, such scale may be divided into linear graduations due to the effect of the logarithmic voltage amplifier 24 as described above, thus enabling the noise level to be read with constant accuracy throughout a range of 40 decibels without the use of multiple attenuators.

Further rotation of the function switch 20 in a counterclockwise direction will enable the direct current energy present between the pair of telephone lines connected to the terminals 11 to be measured on the meter 14 using the scale 16 which is linearly calibrated in miliamperes. It will be seen that the last two contacts on wafers 25 and 26 in the counterclockwise direction are blank. It will also be seen that the DC holding bridge and isolating transformer 31 is not connected into the circuit in the last two counterclockwise positions of the function switch 20; instead, the wafers 21 and 22 connect the terminals 11 to a resistance bridge in such last two counterclockwise positions. The contacts of the wafers 23 and 24 in such last two counterclockwise positions connect the meter 14 to the resistance bridge in such a manner that the DC voltage between the terminals 11 may be reversed in polarity as applied to the meter 14. Thus, a reading on the meter 14 may be obtained without regard to the polarity of the voltage appearing at the terminals 11 by simply selecting the proper one of the last two counterclockwise positions of the function switch 20 marked "current" and "reverse" in FIG. 1. The 100 milliampere range was selected for this embodiment of the invention since in a typical telephone system, a DC current of approximately 90 milliamperes may be encountered near a central office, whereas at least 23 milliamperes of current is required to excite the conventional carbon transmitter unit satisfactorily in operation.

Finally, it will be seen that when the function switch 20 is rotated to its extreme position in the clockwise direction marked "1,000 Hz" in FIG. 1, a signal generator 39 will be connected to the DC holding bridge and isolating transformer 31 through the wafer 25 and such DC holding bridge and isolating transformer 31 will again be connected to the terminals 11 through the wafers 21 and 22, respectively. In such extreme clockwise position, the wafer 26 has a blank contact and the wafers 23 and 24 connect the meter 14 to ground. Thus in this position of the function switch, the unit is adapted to apply a signal to the terminals 11 for transmission over the telephone lines. The signal generator 39 is adapted to generate a 1,000 hertz signal at the zero db power level. Thus the unit 10 according to this embodiment of the invention may act as the source of a test signal for monitoring by other units 10 located along the line under test in accordance with the teaching of this invention. Similarly, the hand set connected to terminals 13 may be utilized to dial a station at which another unit 10 according to the teaching of this invention is located, thus enabling transmission measurements between remote points in the telephone system.

As shown in FIG. 2, the unit 10 is powered by a pair of batteries 40 and 41 which are connected in series to provide the required operating voltage which may be 9 volts, for example. As mentioned hereinabove, each of such batteries 40 and 41 may be individually connected across the meter 14 through a pair of three-pole double-throw switches 19 to enable monitoring of the operation condition thereof. As shown in FIG. 2, opposite sides of the meter 14 are connected to the rotary contact of wafers 23 and 24 respectively of the function switch 20 when the battery test switch pair 19 is in its normal position. When the battery test switch pair 19 is thrown to one of its abnormal positions, the meter 14 is connected across the battery 40 through the resistance 42 and when the battery test switch pair 19 is thrown in the other of its abnormal conditions, the meter 14 is connected across the battery 41 through a resistance 43, thus enabling the voltage level of each battery to be measured independently of the other. As will be explained hereinafter, the apparatus of this invention is self-compensating and insensitive to battery voltage variations over a substantial range so long as the battery voltage is above a selected minimum level. For example, in the embodiment shown and described, the nominal battery voltage is 9 volts and the minimum level is 6 volts. Thus, "zeroing" adjustments are not required in operation if the batteries are replaced when their voltage falls below the selected minimum level.

It will be understood that in order for a logarithmic voltage amplified to be used in accordance with the teaching of this invention, it is necessary that the alternating current voltage developed across the attenuators 32, 36 be rectified with minimum voltage offset. This is due to the fact that solid state devices will amplify both direct current voltages and alternating current voltages simultaneously and obviously any variation in voltage offset could result in erroneous indications relating to the power level of the alternating current transmissions which it is desired to measure.

Referring to FIG. 5, a novel amplifier/rectifier circuit 33 capable of maintaining a much lower and far more constant offset voltage at its output than rectifier circuits of the prior art is shown schematically. Such circuit comprises an operational amplifier 50 having a pair of solid state diodes 51 and 52 connected with opposite polarity in parallel between the input and output of the operational amplifier 50. As shown in FIG. 5, appropriate impedance elements 53, 54 may be connected in series with diodes 51, 52 as required and the output of the rectifier is taken at a point between one of the solid state diodes 52 and its associated impedance element 54.

According to the teaching of this invention, a DC feedback loop is also connected between the output of the operational amplifier 50 and its input. As shown in FIG. 5, such feedback loop comprises an appropriate decoupling impedance 55 connected in series with an appropriate inductor 56 between the input and output of the operational amplifier 50. A capacitance element 57 is connected to ground from the junction of the decoupling impedance 55 and the inductor 56. Thus it will be seen that the direct current component of the output of the operational amplifier 50 will be fed back to its input through the impedance 55 and inductance 56. Any alternating current component of such output which is present at the junction between the inductance 56 and impedance 55 will be attenuated. As shown in FIG. 5, a further impedance element 58 is connected in series with the impedance 55 and inductor 56 in the feedback loop. Such further impedance 58 is included in the feedback loop in order to compensate for spurious reactances present in the feedback loop at high frequencies (such as the capacitive reactance of the inductor 56), and provide the proper circuit Q for the feedback loop at low frequencies. Thus the value of the impedance 58 is selected to optimize the operation of the circuit. It will be understood that the impedance element 58 could be partially replaced by an impedance element connected across the inductor 56 in parallel therewith in the feedback loop and having an appropriate value.

The function of the DC feedback loop is to both reduce the DC offset voltage and reduce the change in DC offset voltage produced in the output of the rectifier by change in the battery voltage. Such offset is indicated by the reference letter A in the output wave form shown in FIG. 5. In prior-art rectifiers, such offset voltage could be as high as 400 millivolts and might vary 100 millivolts with battery voltage variation of 3 volts. When a feedback loop in accordance with the teaching of this invention is utilized, such offset voltage may be limited to a maximum of 1.7 millivolts and variations in such offset voltage may be limited to one-half-millivolt for a battery voltage change of 3 volts.

In a typical circuit in accordance with the teaching of this invention, the operational amplifier 50 may be an integrated circuit sold under the type number CA 3033, the solid state diodes may be of the type sold under type number HP 2800; the impedances 53 and 54 may be 100,000 ohm resistors; the impedance 55 may be a 2,200 ohm resistor; the inductor 56 may have a value of 250 millihenrys; the capacitance element 57 may have a value of 200 microfarads; the impedance element 58 may be resistor having a value of about 1,000 ohms with the input to the circuit being applied through an input resistor 59 having a value of 1,000 ohms.

The use of a feedback loop in accordance with the teaching of this invention renders the device substantially self-compensating in operation. Thus it is unnecessary to provide means for zeroing the meter since the device is substantially insensitive to battery voltage in operation. Thus the battery voltage may decrease from 9 volts to 6 volts in operation without introducing more than about 2/10 of a decibel error in the reading of the meter. Finally, the use of the DC feedback loop makes it possible to replace the operational amplifier 50 without requiring adjustment of the meter or any other part of the circuit.

It will be understood that the method of this invention may be used in sampling transmissions in all types of telecommunications systems, and that the apparatus of this invention may be modified as necessary to meet the requirements of the particular system with which it is to be used. Furthermore, the method and apparatus of this invention may be used to sample transmissions other than those specifically described above. For example, the apparatus may be easily modified to measure noise transmissions along a pair of telephone lines with respect to ground rather than with respect to each other as described hereinabove. Such noise measurements with respect to ground are conventionally made by connecting each of the lines to ground through an impedance bridge providing balanced impedances between each of the lines and a common impedance to ground. The novel amplifier/rectifier circuit including the DC feedback loop may find application in many circuits for sampling transmissions in a telecommunications system, and it is believed that those skilled in the art will find many uses other than those specifically described for such rectifier circuit as well as for the overall method and apparatus disclosed in the foregoing application.

What is claimed is:

1. Apparatus for sampling transmissions in a telecommunication system, said apparatus comprising impedance means having a given characteristic impedance, means for connecting said impedance means into said telecommunication system to develop a voltage thereacross, voltage rectifier means comprising an operational amplifier having an input and an output, means connecting said voltage developed across said given impedance means to said input of said operational amplifier, a pair of diodes connected with opposite polarity in parallel between said input and said output of said operational amplifier, a low pass filter network means comprising a pair of substantially non-capacitive impedances connected in series between said input and said output of said operational amplifier with a highly capacitive impedance connected from between said pair of impedances to ground, logarithmic voltage amplifier means having an input and an output, means connecting said output of said operational amplifier to said input of said logarithmic voltage amplifier means, a linear voltage indicating means having an input and means connecting said output of said logarithmic voltage amplifier to said input of said linear voltage indicating means.

2. Apparatus according to claim 1 wherein said means connecting said output of said logarithmic voltage amplifier means to said linear voltage indicating means includes a linear direct current voltage amplifier.

3. Apparatus according to claim 1 wherein said means connecting said voltage developed across said impedance includes a linear alternating current voltage amplifier.

4. Apparatus as claimed in claim 1 wherein said linear voltage indicating means is an ammeter.

5. Apparatus as claimed in claim 1 wherein said operational amplifier is a solid state integrated circuit, said diodes are solid state diodes and said pair of substantially non-capacitive impedances of said low pass filter network comprise a resistor and an inductor.

6. In apparatus for sampling transmissions in a telecommunication system, a circuit having an input terminal and an output terminal, said circuit comprising an operational amplifier connected between said input terminal and said output terminal, a pair of solid state diodes connected with opposite polarity and appropriate series impedance in parallel between said input terminal and said output terminal, and direct current feedback means connected between said input terminal and said output terminal, said direct current feedback means comprising inductance and resistance in series and high capacitance to ground therebetween.

* * * * *